United States Patent [19]

Schwetz et al.

[11] 4,195,066
[45] Mar. 25, 1980

[54] PROCESS FOR THE PRODUCTION OF DENSE SINTERED SHAPED ARTICLES OF POLYCRYSTALLINE BORON CARBIDE BY PRESSURELESS SINTERING

[75] Inventors: Karl A. Schwetz, Sulzberg, Austria; Georg Vogt, Kempten-Sankt Mang, Fed. Rep. of Germany

[73] Assignee: Elektroschmelzwerk Kempten GmbH, Munich, Fed. Rep. of Germany

[21] Appl. No.: 960,778

[22] Filed: Nov. 15, 1978

[30] Foreign Application Priority Data

Nov. 22, 1977 [DE] Fed. Rep. of Germany ....... 2751998

[51] Int. Cl.² .................. C04B 35/52; C01D 31/36
[52] U.S. Cl. .................. 423/291; 106/43; 264/332
[58] Field of Search .................. 423/291, 439; 106/43; 264/63, 332

[56] References Cited

U.S. PATENT DOCUMENTS

| 2,027,786 | 1/1936 | Ridgway et al. | 423/291 X |
| 2,938,807 | 5/1960 | Andersen | 264/63 |
| 3,914,371 | 10/1975 | Benton et al. | 423/291 X |
| 4,005,235 | 1/1977 | Prochazka | 106/43 X |

Primary Examiner—G. O. Peters
Attorney, Agent, or Firm—Burgess, Ryan and Wayne

[57] ABSTRACT

A method of producing dense shaped articles of pure boron carbide that optionally contain 0.1 to 8% by weight of free carbon in the form of graphite is disclosed involving the steps of homogeneously mixing boron carbide in submicron powder form with small quantities of a carbon containing additive, forming the powder mixture into a shaped green body and then sintering the body in a controlled atmosphere and in the absence of external pressure at a temperature of about 2100°–2200° C. The shaped articles thus obtained are polycrystalline and, insofar as they correspond to the stoichiometric composition $B_4C$, single-phase; they have an average grain size of not more than 10 $\mu$m, a density of at least 90% of the theoretical density of boron carbide and a flexural strength of at least 300 $N/mm^2$. The fracture mode of the sintered articles is completely transcrystalline.

31 Claims, 4 Drawing Figures

PROCESS FOR THE PRODUCTION OF DENSE SINTERED SHAPED ARTICLES OF POLYCRYSTALLINE BORON CARBIDE BY PRESSURELESS SINTERING

BACKGROUND OF THE INVENTION

The present invention relates to a process for the manufacture of dense sintered shaped articles of polycrystalline boron carbide.

Because of the poor sinterability of boron carbide powder, dense sintered shaped articles of boron carbide have to be manufactured industrially by the so-called hot-pressing or pressure-sintering process. In this way, it is possible to manufacture sintered articles of boron carbide having a density of from 2.50 to 2.52 g/cm$^3$ (the latter figure corresponding to 100% of the theoretical density of boron carbide) and practically free of pores, with a residual porosity of less than 1%. Such particles generally have a flexural strength within the range of from 300 to 400 N/mm$^2$, and this serves to characterize their mechanical strength.

This process has the disadvantage that it can be used for the manufacture only of relatively small and geometrically simple shaped articles. Articles of more complex shape cannot be made in this manner, but have to be machined from more simple shapes. Because boron carbide is the next hardest known material after diamond and boron nitride, such machining operations have to be carried out using diamond tools and are time-consuming and expensive. Moreover, the continuous operation of the hot-pressing process is unusually expensive.

An alternative process known for the sintering of articles of other materials is the pressureless sintering process, which enables articles of complex shape to be manufactured relatively cheaply without the need for expensive final machining operations. Moreover, it can also be carried out in a continuous manner using pusher or band type furnaces, thus permitting the economical mass production of shaped articles. Many attempts have therefore been made to produce articles of boron carbide by the pressureless-sintering process. It was found, however, that, using sintering temperatures of from 2250° to 2300° C. with sintering time, of 1 to 2 hours, only moderately dense articles of boron carbide could be produced by this method. Such articles had densities of from 2.0 to 2.2 g/cm$^3$ (corresponding to from 80 to 87% TD - percent of the theoretical density of boron carbide) and flexural strengths of from 50 to 100 N/mm$^2$. In order to achieve densities above 90% TD, and thus increase the flexural strength to up to 200 N/mm$^2$ (cf. K Adlassnig, *Planseeberichte für Pulvermetallurgie* vol. 6 (1958), pages 92–102), it was necessary to use such high temperatures so that surface melting occurred, which, of course, impaired the dimensional stability of the articles.

More recent investigations have also shown that boron carbide powder having an approximately stoichiometric composition can be densified to a high degree only in the immediately premelt temperature range, namely at about 2300° C. (cf. P.S. Kislyi and B.L. Grabtschuk, *Bericht über Untersuchung der Gesetzmässigkeiten bei Erzeugung des Hochdicten Borcarbids durch Sinterung*, 4th European Powder Metallurgy Symposium (Grenoble, France), 1975, INIS-mf-2082; *Chem. Abs.* 87 (1977) 140 112). At such temperatures, practically poreless boron carbide articles can be produced by pressureless-sintering, with residual porosities of from 0.5 to 1% and grain sizes in the microstructure of at least 10 to 15 μm, but the strength of such articles is from 15 to 20% lower than that of similar articles produced by hot-pressing.

The manufacture of dense sintered boron carbide articles containing beryllium carbide, by molding a mixture of submicron powders of boron carbide and beryllium carbide into a shaped green body, and then subjecting the body to pressureless sintering at temperatures of from 2200° C. to 2280° C. is desribed in U.S. Pat. No. 4,005,235. The articles produced by this process are polycrystalline, with a two-phase microstructure with round boron carbide grains having diameters of from 30 to 300 μm and smaller beryllium carbide grains, and densities of at least 85% TD, but no information is given regarding their mechanical strength. The boron carbide submicron powder used had a specific surface area of 16.1 m$^2$/g, corresponding to a particle size of less than 0.1 μm, but it was found that this particle size alone was not of decisive importance, because articles produced from this powder without beryllium carbide, by pressureless sintering at a temperature of up to 2260° C., had densities of up to only about 72% TD.

It is thus apparent that highly densified boron carbide articles can be produced by the pressureless-sintering method only by using very high sintering temperatures of about 2300° C. or by using beryllium carbide conjointly. The former method requires very accurate temperature control in order to avoid the danger of melting the boron carbide, and such control is very difficult in that range. The latter method has the disadvantage that beryllium carbide is highly toxic and very moisture-sensitive and, moreover, the presence of impurities such as beryllium carbide, as well as magnesium and iron, in amounts exceeding about 1% practically precludes the articles from use in the field of nuclear technology, for example as neutron-absorbers.

BRIEF DESCRIPTION OF THE INVENTION

It is, therefore, the primary object of the present invention to provide a process for producing dense sintered shaped articles of polycrystalline boron carbide which are free of the aforementioned and other such disadvantages.

It is another object of the present invention to provide a process for producing dense sintered shaped articles of polycrystalline boron carbide to produce a product which has high flexural strength and density, is dimensionally stable, consists essentially of only boron and carbon, and can have a complex shape.

It is a further object of the present invention, consistent with the foregoing objects, to provide a product of the aforementioned process.

The present invention provides a process for the manufacture of a dense sintered shaped article of boron carbide, which comprises (i) forming a homogeneous mixture of
  (a) boron carbide having a B : C atomic ratio within the range of from 4.5 : 1 to 3.5 : 1 and a particle size not exceeding 1 μm, and
  (b) a carbon-containing component consisting of amorphous carbon or of an organic material that can be coked to form amorphous carbon at a temperature not exceeding 1000° C, in an amount corresponding to from 0.5 to 10% of amorphous carbon, based on the weight of the boron carbide, (ii) molding and shaping the mixture into a green body having a density of at least 50% of the theoretical density of boron carbide, and (iii) sintering the green body, in a an atmosphere inert to boron carbide or in vacuo, at a temperature within the range of from 2100° C., to 2200° C., to form an article having a density of at least 90% of the theoretical density of boron carbide.

DESCRIPTION OF THE PREFERRED EMBODIMENTS

The dense sintered shaped articles of polycrystalline boron carbide manufactured according to the process of the invention consist almost exclusively of boron and carbon. Thus, the process according to the invention enables the so-called self-bonding of boron carbide to be achieved by a pressureless-sintering process, whereas this could previously be achieved only by the hot-pressing process. This contrasts with the process according to U.S. Pat. No. 4,005,235 mentioned above, in which the articles are foreign-bonded by the beryllium carbide.

The proportions of boron and carbon in the article manufactured according to the invention advantageously correspond approximately to the stoichiometric composition $B_4C$. This may be achieved by using boron-rich boron carbide powder, with a B:C atomic ratio within the range of from 4.1:1 to 4.5:1, together with the carbon-containing component in an amount corresponding to the stoichiometric composition, namely in an amount within the range of from 0.5 to 2% of free carbon, based on the weight of the boron carbide. Any boron initially present in excess of the stoichiometric B:C atomic ratio of 4.0:1 apparently reacts with the amorphous carbon during the sintering process so that the final article is of practically stoichiometric composition $B_4C$. The product is practically single-phase, by which is meant that no free carbon in the form of graphite can be detected either by X-ray diffraction analysis or ceramographically.

When a relatively large amount of the carbon-containing component is used (that is, up to about 10% of free carbon, based on the weight of the boron carbide), the sintered article contains some graphite, which is detectable by X-ray diffraction analysis as graphite intercalations. In this case, the free carbon content of the sintered articles can be varied within the range of from 0.1 to 8% by weight. The same is also true when a carbon-rich boron carbide powder is used initially, and when a boron carbide powder of approximately stoichiometric composition is used, together with the carbon-containing component in an amount of up to about 5% of free carbon, based on the boron carbide.

The boron carbide used in the present process advantageously has a purity of at least 98.5% by weight, by which is meant that the sum of the boron content and the carbon content should total at least 98.5%. Metallic impurities can be tolerated up to a total of 0.5% by weight, with the remaining impurities not exceeding 1% by weight and being oxygen and nitrogen in the form of boron oxide and boron nitride, respectively. The boron carbide powder must have a particle size distribution not exceeding 1 $\mu$m. As the particle size of boron carbide cannot be determined directly with sufficient accuracy in the submicron range, the specific surface area (measured according to the BET method described in ASTM Special Technical Publication No. 51, 1941, pages 95–105) may be used as a measure of the average particle size, according to the equation $$\bar{d} = 6/(S \cdot \rho)$$

in which $\bar{d}$ denotes the average particle size in $\mu$m, s denotes the specific surface area in m²/g, and $\rho$ denotes the powder density in g/cm³.

Boron carbide powder having a specific surface area within the range of from 10 to 50 m²/g is preferably used.

The boron carbide powder may be amorphous or crystalline. It may be obtained directly, with the required submicron fineness, by precipitation from the gaseous phase, for example from a boron halide or borane and a gaseous hydrocarbon. For economical reasons, however, it is preferred to use industrially produced coarse-grained crystalline boron carbide, which has been manufactured, for example, by the reduction of boric acid with carbon in an electric furnace. Such coarse-grained boron carbide is subjected to intensive grinding to a particle size of 3 $\mu$m and finer, and then the powder having the required specific surface area may be separated from this ground product in a known manner, for example by air classification or elutriation.

The presence of amorphous carbon, in the specified quantity, at the commencement of sintering is essential, because it has been shown that, if the process were carried out using boron carbide of the specified atomic ratios without the carbon-containing component, articles of the required density of at least 90% TD could only be obtained at temperatures around the melting point of boron carbide. This conforms the fact stated previously that the use of boron carbide of submicron fineness is not alone sufficient to give the desired results. It has also been shown that carbon-rich boron carbide, manufactured with an excess carbon content of about 2% by weight, could not be densified to more than about 85% theoretical density at up to 2200° C. This is probably because the free carbon in carbon-rich boron carbide is in the form of graphite, which is not sufficiently active to give the desired results.

The boron carbide therefore has first to be mixed with a carbon-containing component which either consists of amorphous carbon or which will coke to form amorphous carbon at a temperature of up to about 1000° C. In the former case, the amorphous carbon may, for example, be carbon black, for example acetylene black, advantageously having a specific surface area within the range of from 10 to 400 m²/g. In this case, it is advantageous to use a small amount of a temporary binder in the boron carbide/carbon black mixture, for example polyvinyl alcohol, stearic acid, or polyethylene glycol, in an amount of up to about 1% by weight, based on the weight of the boron carbide.

It is preferred to use a carbon-containing component that will coke to form amorphous carbon and, in this case, this component may be solid or liquid at room temperature. Suitable substances for use as this component are, for example, coal-tar pitch and phenolic resins, especially phenol/formaldehyde condensation products of the novolak or resole types, which will coke at temperatures of from 100° to 900° C. to form amorphous carbon in a yield of from 35 to 50%.

The amount of amorphous carbon in the mixture should be within the range of from 0.5 to 10% of free carbon, based on the weight of the boron carbide. Amounts below about 0.5% by weight are not sufficiently effective for the desired purpose, that is to say, sufficient densification of the boron carbide cannot be achieved with such amounts, and amounts above about 10% by weight give no improvement and can result in hypereutectic carbon contents in the sintered article, which can adversely affect its density and flexural strength. Advantageously, a free carbon content within the range of from 0.5 to 7% by weight, especially about 3% by weight, based on the boron carbide, is used.

In carrying out the process according to the invention, first the boron carbide is homogeneously mixed with the carbon-containing component and, optionally, a temporary binder. Such homogeneous mixing is advantageously effected by carrying out the mixing in an organic solvent for example acetone or an aliphatic alcohol having up to 6 carbon atoms. When the carbon-containing component is amorphous carbon, the temporary binder is advantageously first dissolved in the solvent and then the boron carbide powder and the amorphous carbon may be dispersed in the solution of the temporary binder. On the other hand, when the carbon-containing component is an organic material that will coke to form amorphous carbon, this carbon-containing component is advantageously first dissolved in the solvent, and the boron carbide powder may then be dispersed in the resulting solution. Dispersion of the boron carbide and, when necessary, of the amorphous carbon in the solvent, may be effected in a known manner. For example, if the amount of solvent present is sufficient to give a thin liquid suspension, dispersion may be effected simply by stirring the suspension in a plastics container using a polytetrafluoroethylene-coated magnetic stirrer, whereas, if the amount of solvent present is sufficient to give only a thick liquid suspension, dispersion may be effected by kneading in a conventional kneading device. The solvent is then removed to leave a homogeneous mixture of boron carbide and the carbon-containing component. In the case of a thin liquid suspension, removal of the solvent may be effected by spray drying or freeze drying and, in the case of a thick liquid suspension, removal of the solvent may be effected by evaporation during kneading.

The homogeneous mixture is then formed into a shaped, green body having a density of at least 50% TD. To mold and shape the powder mixture into a desired form, any of the conventional techniques generally used in the field of ceramics may be applied, i.e., die pressing, isostatic pressing, injection molding, extrusion, or slip casting. When using die pressing or isostatic pressing, the pressure applied may be within the range of from 300 to 6000 bar, preferably from 1000 to 3000 bar.

To obtain more complex shapes, the preformed green body may be machined to the desired configuration optionally after subjecting the green body to a prefiring step. This prefiring step may be carried out in an inert atmosphere at a temperature within the range of from 100° to 1500° C. The inclusion of this additional heating step has the advantage of strengthening the green body, which is particularly important for its machinability.

The shaped green body, is then sintered, in an inert atmosphere or in vacuo, at a temperature within the range of from 2100° to 2200° C., to form an article having a density of at least 90% TD, preferably at least 95% TD. It has been found that if sintering of the green body is carried out at a temperature below 2100° C., but under otherwise identical conditions, the sintered article generally has a density of less than 90% TD. On the other hand, if sintering is carried out at a temperature of more than 2200° C., although the sintered article has a higher density, its strength properties are poorer because a very coarse-grained microstructure is obtained at such higher temperatures.

When the carbon-containing component used is an organic material that will coke to form amorphous carbon, such coking will occur while heating the green body to the sintering temperature, if coking has not previously occurred during the optional preheating step. Thus, at the commencement of sintering within the specified temperature range, the carbon is already present in amorphous form, irrespective of the type of carbon-containing component initially used.

The green body to be sintered may be accommodated in an inert container, for example a crucible of graphite or titanium boride, which is introduced into the heating zone of a high temperature furnace provided with means to control the furnace atmosphere. If sintering is carried out in an inert gas atmosphere, it is advantageously carried out at about normal pressure, that is at about 1.01 bar. Suitable inert gases for this purpose are hydrogen, nitrogen, carbon monoxide and the noble gases, for example argon or helium. Preferably, however, sintering is carried out in vacuo, especially at a pressure not exceeding 1.3 bar. Carrying out of the sintering in vacuo has the advantage that any sintering-inhibiting surface layers on the boron carbide particles, for example surface layers of boron trioxide or boron nitride, are removed at temperatures below 1600° C. and thus do not hinder sintering within the specified temperature range.

Sintering of the boron carbide compacts can be done in conventional high temperature furnaces, i.e., in a graphite-tube resistance furnace, an induction-heating furnace or, for continuous operation, a pusher or band-type furnace (in which the articles are transported through the heating zone in such a manner that they are maintained at the desired temperature for a predetermined period). The heating program used (that is to say, the rates of heating and cooling, and the duration at the sintering temperature) depends on the size of the articles to be sintered. Small articles, that is those weighing only a few grams, are relatively insensitive to the temperature program and can be heated to the sintering temperature fairly rapidly, that is over a period of about 45 minutes, and may be maintained at the sintering temperature for a period of about 15 minutes. Larger articles require much longer heating programs in order to avoid temperature gradients in the article being heated. For example, an article weighing about 100 grams may be heated to about 400° C. over a period of 1 hour, to 1500° C. over a second hour, and to 2100° C. over a third hour, whereupon it may be maintained at this temperature for about 30 minutes. The dwell time at the sintering temperature depends on the size and shape of the article, but dwell times within the range of from 10 to 60 minutes are generally sufficient to achieve densities of at least 90% TD. Too long a dwell time may result in a coarse-grained microstructure with a consequent deterioration in the mechanical strength of the sintered article. Cooling to room temperature is conveniently effected in a period of about 2 hours.

The article generally undergoes some shrinkage during sintering and this should be taken into account in determining the final dimensions of the sintered article.

These dimensions after sintering depend on the density of the green body after pressing and shaping or, if carried out, after the additional heating step, and on the density of the final sintered body and are established in a known manner. In the production of the desired sintered boron carbide articles according to the present invention, a linear shrinkage of 15 to 18%, (based on the green density of about 60% TD) was generally observed.

Figure 1:
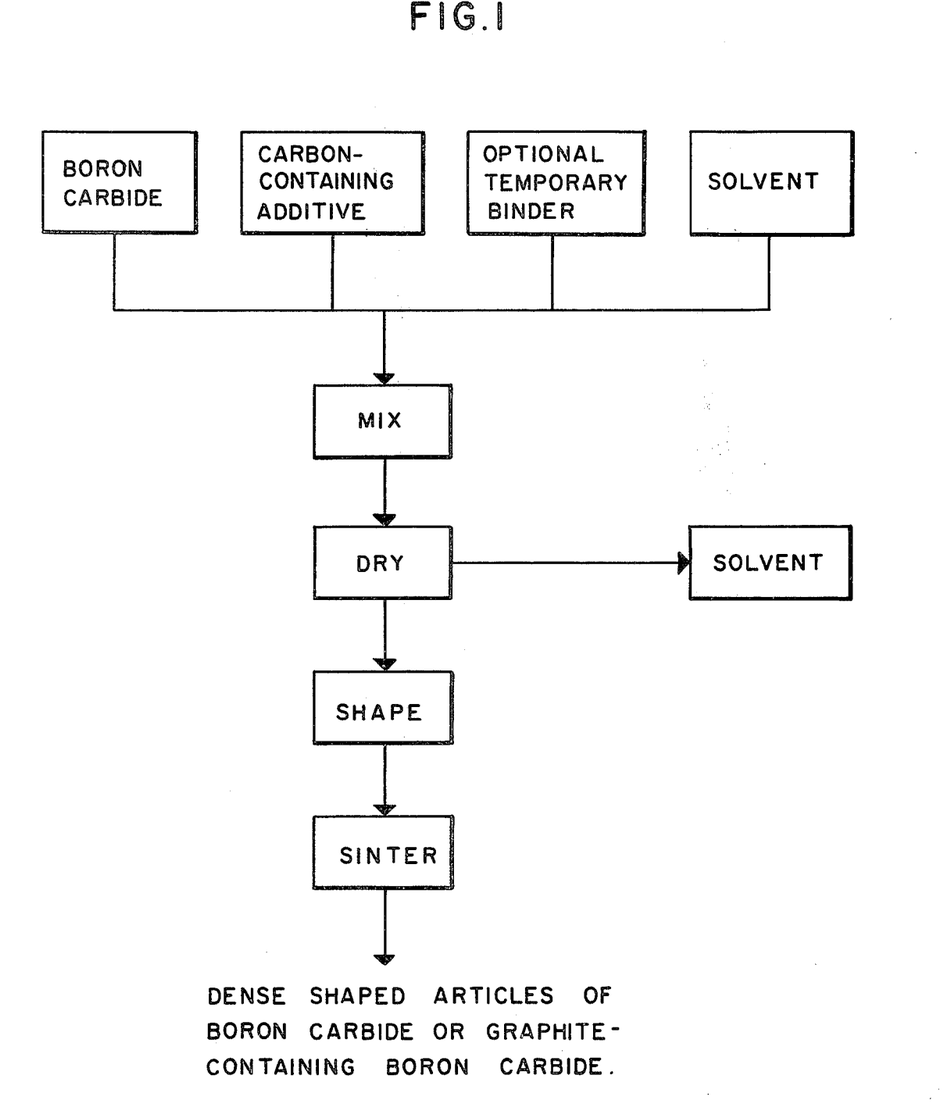

The above-described method of carrying out the process according to the invention is summarized in the flow diagram shown in FIG. 1 of the accompanying drawings.

Figure 2:
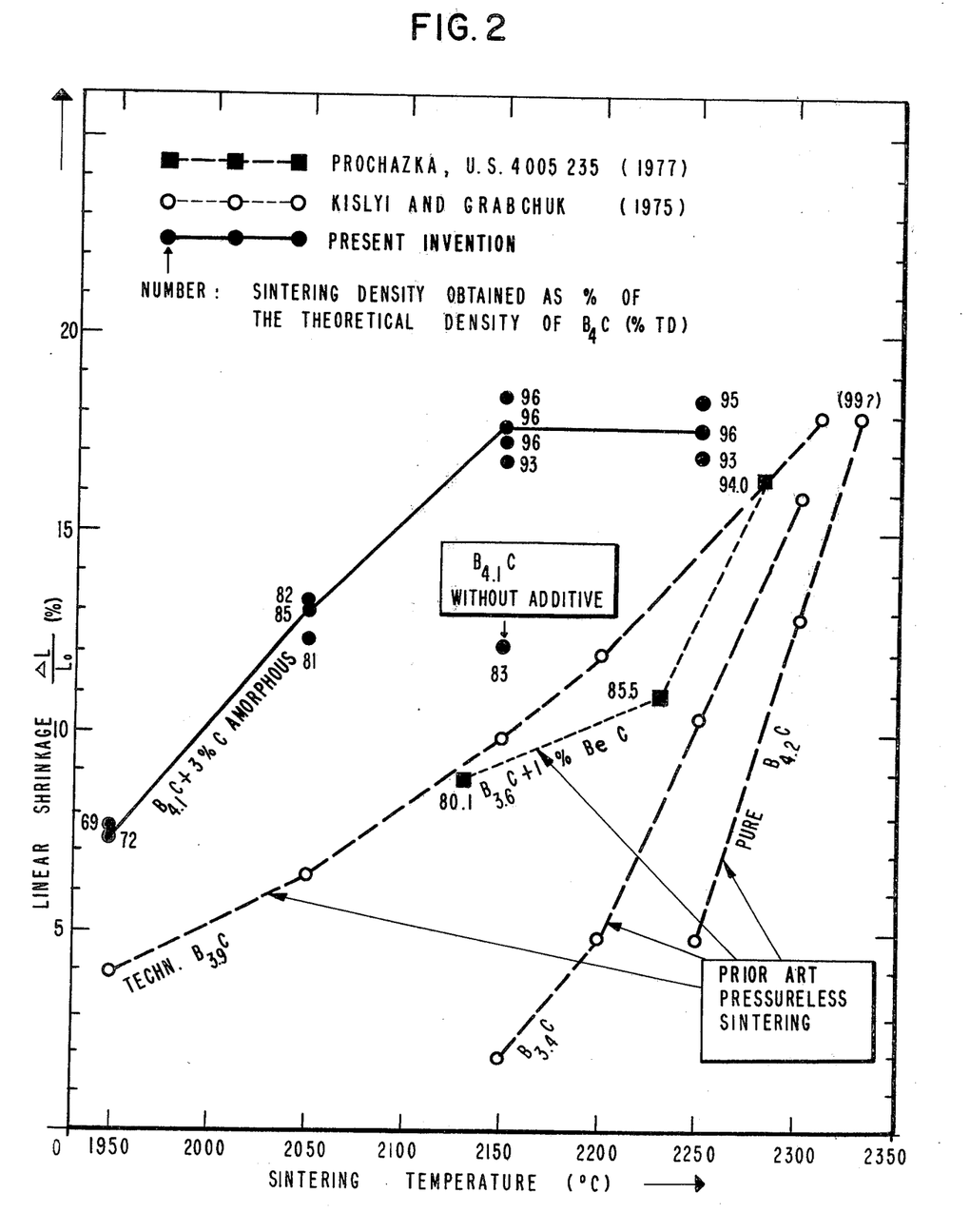

FIG. 2 of the accompanying drawings shows a graph comparing the densities of the sintered compacts obtained according to the process of the invention with those obtained in certain of the prior art pressureless-sintering processes mentioned above. In this graph, the percentage linear shrinkage $\Delta L/L_o$ (in which $\Delta L = L_o - L$, $L$ = the diameter of the densified article after sintering, and $L_o$ = the diameter of the shaped green body having a density of about 60% TD prior to sintering) is plotted against the sintering temperature. The numbers entered adjacent to the plotted values indicate the respective densities of the sintered boron carbide bodies in % TD. The solid black line and the solid black round dots indicate the results achieved according to the process of the invention, using boron carbide having a B:C atomic ratio of 4.1:1 together with 3% of amorphous carbon, based on the weight of the boron carbide. The long-dashed lines and the hollow round dots indicate the results achieved according to Kislyi and Grabtschuk (op. cit.), using boron carbide having B:C atomic ratios of 3.4:1, 3.9:1 and 4.2:1. The short-dashed line and the solid black square dots indicate the results obtained according to Prochazka (US-PS 4 005 235), using boron carbon having a B:C atomic ratio of 3.6:1 together with 1% of $Be_2C$, based on the weight of the boron carbide.

Figure 3:
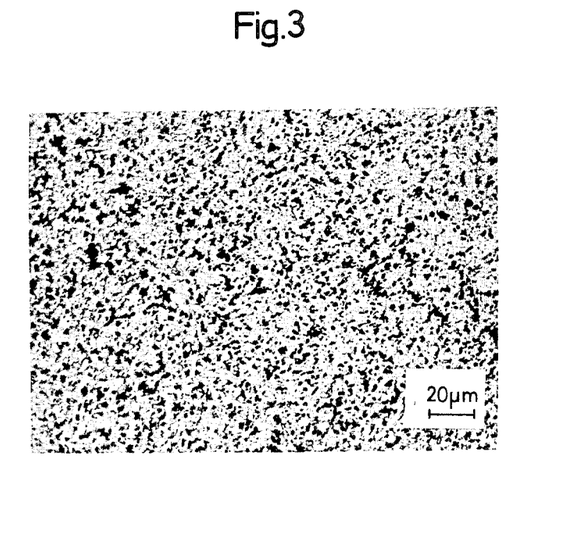
Figure 4:
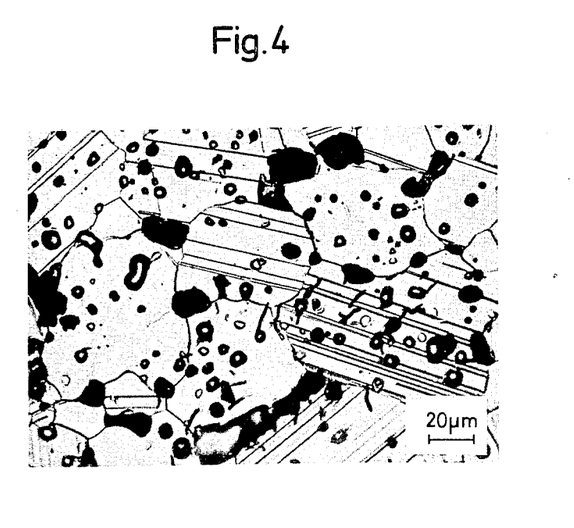

FIGS. 3 and 4 of the accompanying drawings are photomicrographs with a 500-fold magnification illustrating the microstructure, grain size and porosity of the etched specimens: The uniform fine-grained microstructure shown in FIG. 3 belongs to a sintered boron carbide article which was produced according to the process of the invention, from boron carbide submicron powder together with additional carbon (cf. Ex. 1 below), whereas the coarse-grained microstructure shown in FIG. 4 with the large pores shown in FIG. 4 belongs to a sintered article, which was produced in a similar manner from identical boron carbide submicron powder but with no added carbon (cf. Ex. 9 below).

Sintered articles produced according to the process of the invention have a density of at least 90% TD, preferably at least 95% TD and, despite a low residual porosity, generally have a flexural strength of at least 300 N/m m². The absence of metallic impurity phases, the extremely fine-grained microstructure (with an average grain size of less than 10 μm, often less than 5 μm), and the occurrence of a transcrystalline fracture mode contribute to the high mechanical strength.

Sintered articles produced according to the process of the invention are suitable for use in abrasion engineering, for example as sand-blasting nozzles, as dressing tools, as linings for grinding aggregates, and as lightweight armour plates for protection against bullets, shot, and the like, as well as for neutron absorption in nuclear technology, for example as absorber rods or shieldings.

The following examples illustrate the process according to the invention and compare the results achieved with those achieved in certain other processes not according to the invention. All parts and percentages are by weight unless otherwise stated. All examples marked with an asterisk are for comparison purposes and are not according to the invention.

EXAMPLE 1

The boron carbide powder used had a specific surface area of 15.1 m²/g, was single-phase as shown by X-ray diffraction analysis, and had the following chemical composition:

| | |
|---|---|
| C | 21.27% |
| $B_2O_3$ | 0.38% |
| N | 1500 ppm |
| Si | 1500 ppm |
| Fe | 700 ppm |
| Al | 200 ppm |
| Ti | 200 ppm |
| Mg | 70 ppm |

(which, taking into account the boron present as $B_2O_3$, and the BN, corresponds to a B:C atomic ratio of 4.1:1).

10.5 parts of a commercial pulverulent phenol/formaldehyde resin of the novolak type (corresponding to about 3% C., based on the boron carbide), in the form of a solution in acetone, were mixed with 100 parts of the boron carbide powder (using about 100 ml of the novolak solution per 100 gram of boron carbide) to give a thick liquid paste which was kneaded in air until almost all the solvent had evaporated and only a faint smell of acetone could be detected. The total kneading time was about 60 minutes. The product was a crumbly powder dry to the touch.

This product was then isostatically pressed in rubber bags under a pressure of 1500 bar for 2 minutes to give cylindrical green bodies each having a diameter of 8 mm a length of 40 mm and a density of 58 to 60% TD.

The green bodies were then placed in a graphite crucible in the heating zone of a graphite-tube resistance furnace. After flushing the furnace several times with argon gas, the green bodies were heated under a vacuum of 0.133 mbar, from 20° C. to 2150° C. over a period of 45 minutes whereupon they were maintained at 2150° C. for a further 15 minutes, after which the furnace was switched off and the green bodies were allowed to cool to room temperature in the furnace.

The sintered articles had undergone linear shrinkage of 18%, based on the diameter of the green bodies. They had a density of 2.42 g/cm³, which corresponds to 96% TD.

The analysis was as follows:

| | |
|---|---|
| C | 24.85% |
| 0 | 800 ppm |
| N | 200 ppm |
| metallic impurities | max. 3000 ppm |

X-ray diffraction analysis showed rhombohedral boron carbide and weak lines of graphite. Thus, based on the total carbon content graphite as second phase in an amount of approximately 3 percent by weight is present. The flexural strength of the sintered articles was 350 N/mm², measured using prismatic bars 4 mm×4 mm×30 mm in three points bending (span width: 25 mm). The fracture surface of the broken bars showed a transcrystalline appearance. FIG. 3 is a photomicrograph with 500-fold magnification and shows the extremely fine-grained and uniform microstructure of the sintered article: the average grain size was 4 μm and no graphite phase could be detected ceramographically. The microstructure shown was revealed via electrolytic etching of a polished specimen-section with dilute sulphuric acid.

EXAMPLE 2

The procedure of Example 1 was repeated with the variation that 3% of carbon black having a specific surface area of 150 m²/g and, as a temporary binder, 1% of polyvinyl alcohol, in the form of an aqueous solution, (both percentages based on the boron carbide) were used instead of the novolak/acetone solution.

The green body had a density of 53% TD and the sintered article had a density of 92% TD, with a total C content of 24.80%.

EXAMPLE 3

The procedure of Example 1 was repeated with the variations that 1.75 parts of a commercial phenol resin of resole stage A (corresponding to 0.5% C based on the boron carbide) were used instead of 10.5 parts of the novolak resin, and that compression was carried out using a pressure of 2500 bar.

The green body had a density of 61% TD and the sintered article had a density of 96% TD, with a flexural strength of 340 N/mm², an average grain size of 5 μm, and a total C content of 21.84%. Free carbon in the form of graphite could be detected neither by X-ray diffraction analysis nor ceramographically.

It is apparent from this example that, starting from boron-rich boron carbide powder to which a stoichiometric amount of amorphous carbon is added, boron carbide sintered articles having the composition $B_{4.0}C$ can be produced. The amount of boron exceeding the B:C atomic ratio of 4:1 apparently reacts with the amorphous carbon during sintering to form stoichiometric boron carbide.

EXAMPLES 4 AND 5

The procedure of Example 1 was repeated with the variations that the novolak/acetone solution was omitted and that the compression pressure was 1500 bar (Example 4) and 6000 bar (Example 5). In the former case, a green density of 50% TD and a final density of 78% TD (Ex. 4), whereas in the latter case (Ex. 5) a green density of 65% TD and a final density of 83% TD was obtained. It is apparent from these examples that sintered articles having densities of more than 90% TD cannot be produced by pressureless sintering at 2150° C. merely by using submicron boron carbide powder, even when using high pressures for the molding step. This confirms the known fact that the particle size of the boron carbide is not alone important in achieving the desired result.

EXAMPLE 6 to 17

The procedure of Example 1 was repeated with the variations that:
(i) the amount of the novolak resin used was varied to give the amounts of C indicated in Table 1 below (% of C added based on the boron carbide);
(ii) the sintering temperature was as indicated in Table 1 below; and
(iii) the sintering atmosphere was either a vacuum ($10^{-1}$ torr=0.133 mbar) or an argon atmosphere (760 torr =1.011 bar) as indicated in Table 1 below.

Table 1 also lists the densities (% TD) of the green bodies and sintered articles, and additionally includes the results from Examples 1 and 4.

TABLE 1

| Example No. | Added Carbon (%) | Sintering Temperature (°C.) | Sintering Atmosphere | Density of Green Body (% TD) | Density of Sintered Article (% TD) |
|---|---|---|---|---|---|
| 6* | 0.0 | 2050 | Vacuum | 50 | 64 |
| 7* | 3.0 | 2050 | " | 60 | 85 |
| 4* | 0.0 | 2150 | " | 50 | 78 |
| 8 | 1.0 | 2150 | " | 56 | 92 |
| 1 | 3.0 | 2150 | " | 58 | 96 |
| 9* | 0.0 | 2250 | " | 50 | 88 |
| 10* | 1.0 | 2250 | " | 54 | 93 |
| 11* | 3.0 | 2250 | " | 58 | 95 |
| 12* | 0.0 | 2150 | Argon | 50 | 82 |
| 13 | 1.0 | 2150 | " | 56 | 90 |
| 14 | 3.0 | 2150 | " | 60 | 93 |
| 15* | 0.0 | 2250 | " | 50 | 89 |
| 16* | 1.0 | 2250 | " | 55 | 94 |
| 17* | 3.0 | 2250 | " | 60 | 96 |

The products obtained without the use of additional carbon (Examples 6, 4, 9, 12 and 15) all had much lower densities than those products obtained under otherwise identical conditions but with additional carbon. FIG. 4 is a photomicrograph with 500-fold magnification illustrating the microstructure of the sintered article of Example 9, which had a density of 88% TD, an average grain size of 60 μm and a flexural strength of 170 N/mm². A comparison with FIG. 3 clearly shows the difference in microstructure between an article produced with additional carbon according to the invention and one produced without additional carbon. Moreover, it is apparent from Examples 9 and 15 that densities of 90% TD cannot be achieved without additional carbon even when using a high sintering temperature of 2250° C.

The product obtained with additional carbon but at the low sintering temperature of 2050° C. (Example 7) was insufficiently densified. On the other hand, the products obtained with additional carbon but at the high sintering temperature of 2250° C. (Examples 10, 11, 16 and 17) were sufficiently densified but had a coarse-grained microstructure, with an average grain size of 20 to 300 μm, and had poor flexural strengths of 50 to 200 N/mm².

Comparison of Examples 13 and 14 with Examples 8 and 1 shows that better results are generally achieved according to the process of the invention when using a vacuum for sintering rather than an inert atmosphere.

EXAMPLES 18 TO 22

The procedure of Example 1 was repeated with the variations that:
(i) the boron carbide powder used had a specific surface area of 28.1 m²/g and had the following chemical composition:

| | |
|---|---|
| C | 22.40% |
| $B_2O_3$ | 0.20% |

| | |
|---|---|
| N | 1000 ppm |
| Si | 1200 ppm |
| Fe | 600 ppm |
| Ti | 200 ppm |
| Al | 200 ppm |
| Mg | 100 ppm |

(which, taking into account the boron present as $B_2O_3$ and BN corresponds to a B:C atomic ratio of 3.8:1); and (ii) the amount of the novolak resin used was varied to give the amounts of C indicated in Table 2 below (%, of C added based on the boron carbide).

The densities (% TD) of the green bodies and sintered articles produced, and the flexural strengths of the sintered articles (N/mm$^2$) are given in Table 2.

TABLE 2

| Example No. | Added Carbon (% C.) | Density of Green Body (% TD) | Density of Sintered Article (% TD) | Flexural Strength of Sintered Article (N/mm$^2$) |
|---|---|---|---|---|
| 18* | 0.0 | 54 | 77 | Soft as chalk |
| 19 | 0.5 | 54 | 94 | 350 |
| 20 | 3.0 | 62 | 96 | 450 |
| 21 | 7.0 | 65 | 93 | 300 |
| 22* | 11.0 | 65 | 85 | 210 |

It is apparent from Example 18 that only a low final density is obtained by pressureless sintering at 2150° C. without added carbon, and the product obtained had a strength similar to that of blackboard chalk. Examples 19 to 21 show that articles having densities of over 90% TD and flexural strengths of at least 300 N/mm$^2$ are obtained with added carbon in amounts from 0.5 to 7.0%. The presence of 11.0% of added carbon, however, has a negative influence as may be seen from Example 22.

EXAMPLES 23* AND 24

The procedure of Example 1 was repeated with the variations that:

(i) the boron carbide powder used was a carbon-rich boron carbide having a specific surface area of 13.1 m$^2$/g and a carbon content of 23.98%, and in which graphite could clearly be detected by X-ray diffraction analysis with a B:C atomic ratio of 3.5:1, corresponding to a free graphite content of about 2.3%, and (ii) in Example 23, no novolak resin was used and, in Example 24, the amount of novolak resin corresponded to 4% added carbon.

The green body obtained in Example 23 had a density of 61% TD and the sintered article had a density of only 85% TD. The sintered article obtained in Example 24, however, had a density of 91% TD.

A comparison of these two examples shows that the free carbon merely present as graphite in carbon-rich boron carbide powders do not produce the desired bodies with a density of at least 90% TD.

What is claimed is:

1. A process for the manufacture of a dense sintered shaped article of boron carbide, which comprises (i) forming a homogeneous mixture of (a) boron carbide having a B:C atomic ratio within the range of from 4.5:1 to 3.5:1 and a particle size not exceeding 1 μm, and (b) a carbon-containing component consisting of amorphous carbon or of an organic material that can be coked to form amorphous carbon at a temperature not exceeding 1000° C., in an amount corresponding to from 0.5 to 10% free carbon, based on the total weight of the boron carbide, (ii) molding and shaping the mixture into a green body having a density of at least 50% of the theoretical density of boron carbide, and (iii) sintering the green body in an atmosphere inert to boron carbide or in vacuo, at a temperature within the range of from 2100° C. to 2200° C., to form an article having a density of at least 90% of the theoretical density of boron carbide.

2. A process as claimed in claim 1, wherein the boron carbide used has a B:C atomic ratio within the range of from 4.1:1 to 4.5:1, and wherein the carbon-containing component is used in an amount within the range of from 0.5 to 2% of free carbon, based on the weight of the boron carbide.

3. A process as claimed in claim 1 or claim 2, wherein the boron carbide has a purity of at least 98.5% by weight.

4. A process as claimed in claim 3, wherein the boron carbide contains not more than 0.5% by weight of metallic impurities and not more than 1.0% by weight of oxygen and nitrogen.

5. A process as claimed in claim 1, wherein the boron carbide has a specific surface area within the range of from 10 to 50 m$^2$/g.

6. A process as claimed in any one of claims 1, 2 or 5, wherein the carbon-containing component is carbon black.

7. A process as claimed in claim 6, wherein the carbon black is acetylene black.

8. A process as claimed in claim 6, wherein the carbon black has a specific surface area within the range of from 10 to 400 m$^2$/g.

9. A process as claimed in claim 6, wherein a temporary binder is included in the mixture of the boron carbide and the carbon black.

10. A process as claimed in claim 9, wherein the temporary binder is polyvinyl alcohol, stearic acid or polyethylene glycol.

11. A process as claimed in claim 9, wherein the temporary binder is used in an amount of up to 1% of weight, based on the boron carbide.

12. A process as claimed in any one of claims 1, 2 or 5, wherein the carbon-containing component is coal-tar pitch or a phenolic resin.

13. A process as claimed in claim 12, wherein the carbon-containing component is a novolak or resole phenol/formaldehyde condensation product.

14. A process as claimed in claim 1, wherein the carbon-containing component is used in an amount within the range of from 0.5 to 7% by weight of free carbon, based on the boron carbide.

15. A process as claimed in claim 1, wherein the boron carbide and the carbon-containing component are mixed in an organic solvent which is subsequently removed.

16. A process as claimed in claim 15, wherein the solvent is acetone or an aliphatic alcohol having up to 6 carbon atoms.

17. A process as claimed in claim 1, wherein the molding of the mixture is effected under a pressure within the range of from 300 to 6000 bar.

18. A process as claimed in claim 17, wherein molding of the mixture is effected under a pressure within the range of from 1000 to 3000 bar.

19. A process as claimed in claim 1, wherein between molding and sintering, the green body is heated in an inert atmosphere to a temperature within the range of from 100 to 1500° C.

20. A process as claimed in claim 1, wherein prior to sintering, the green body is machined to a complex shape.

21. A process as claimed in claim 1, wherein prior to sintering, the green body is subjected to a prefiring step and the prefired body is machined to a complex shape.

22. A process as claimed in claim 1, wherein sintering is carried out under a pressure not exceeding 1.3 mbar.

23. A process as claimed in claim 1, wherein sintering is carried out in an inert gas atmosphere at normal pressure.

24. A process as claimed in any one of claims 1 or 23, wherein sintering is carried out in an atmosphere of hydrogen, nitrogen, carbon monoxide, or a noble gas.

25. A process as claimed in claim 1, wherein the dwell time at maximum sintering temperature is within the range of from 10 to 60 minutes.

26. A dense sintered shaped article of boron carbide that has been manufactured by a process as claimed in claim 1.

27. An article as claimed in claim 26, that contains from 0.1 to 8% by weight of graphite.

28. An article as claimed in claim 26 or claim 27, that has a density of at least 95% of the theoretical density of boron carbide.

29. An article as claimed in any one of claims 26 or 27, that has a flexural strength of at least 300 N/mm$^2$.

30. An article as claimed in any one of claims 26 or 27, that has an average grain size of less than 10 $\mu$m.

31. An article as claimed in claim 30, that has an average grain size of less than 5 $\mu$m.

* * * * *

UNITED STATES PATENT OFFICE
CERTIFICATE OF CORRECTION

Patent No. 4,195,066  Dated March 25, 1980

Inventor(s) Karl A. Schwetz, et al

It is certified that error appears in the above-identified patent and that said Letters Patent are hereby corrected as shown below:

In the Drawings, in Fig. 2, referring to the Prochazka patent: "$B_{3.6}C + 1\% \text{ Be C}$" should read --$B_{3.6}C + 1\% \text{ Be}_2C$--.

Column 1, line 45: "with sintering time," should read --with a sintering time--.

Column 3, line 6: Delete "a".

Column 6, line 28: "1.3 bar" should read --1.3 mbar--.

Column 9, line 45: "EXAMPLES 4 AND 5" should read --EXAMPLES 4* AND 5*--.

Signed and Sealed this

Sixteenth Day of September 198

[SEAL]

Attest:

SIDNEY A. DIAMOND

Attesting Officer   Commissioner of Patents and Trademar